United States Patent [19]

Feinbloom

[11] 4,329,015
[45] May 11, 1982

[54] APPARATUS FOR INCREASING THE INPUT LIGHT INTENSITY TO A MICROSCOPE

[75] Inventor: Richard Feinbloom, New York, N.Y.
[73] Assignee: Designs for Vision, Inc., New York, N.Y.
[21] Appl. No.: 178,157
[22] Filed: Aug. 14, 1980

Related U.S. Application Data

[60] Division of Ser. No. 945,122, Sep. 25, 1978, Pat. No. 4,251,128, which is a continuation of Ser. No. 851,935, Nov. 16, 1977, abandoned.

[51] Int. Cl.$^3$ .............................................. G02B 21/12
[52] U.S. Cl. ........................................................ 350/91
[58] Field of Search ............... 350/91, 237, 49, 276 R, 350/276 SL; 351/16

[56] References Cited

U.S. PATENT DOCUMENTS 3,909,106  9/1975  Buhler .................................. 350/49

OTHER PUBLICATIONS

Brumberg, Ye. M. et al., *Optical Tech.*, vol. 41, No. 1, Jan. 1974, pp. 64-65.

*Primary Examiner*—Jon W. Henry
*Attorney, Agent, or Firm*—Arthur L. Plevy

[57] ABSTRACT

A microscope body has coupled thereto a lens with the axis of said lens relatively transverse to the optical axis of said microscope. A mirror is positioned with respect to said lens to deflect any light propagating through said lens relatively parallel to the optical axis of said microscope and through the objective lens of said scope to the object plane; and a fiber optic cable is directed at one end to propagate light from a remote source through said lens and thence, to said mirror. Means are provided to prevent spurious light or reflections from the surface of the objective lens from appearing at the visual plane of said microscope.

5 Claims, 5 Drawing Figures

TILTED OBT. LENS

APPARATUS FOR INCREASING THE INPUT LIGHT INTENSITY TO A MICROSCOPE

This is a divisional of application Ser. No. 945,122 filed on Sept. 25, 1978, now U.S. Pat. No. 4,251,128 which is a continuation of application Ser. No. 851,935 filed on Nov. 16, 1977 and now abandoned.

BACKGROUND OF INVENTION

This invention relates to microscopes in general and more particularly, to apparatus for increasing the light input to a microscope.

Generally speaking, the amount of light available in a microscope determines the clarity with which the image is viewed and for exacting work such a microscope should preferably provide the user with a clear image at optimum intensity. A particular problem exists in the use of the so-called "operation microscopes" or those devices used by surgeons and physicians to aid in performing delicate surgical procedures. The use of such microscopes in consistent with a desire to provide increased illumination at the object plane as above indicated and is coupled with the further problem of reducing heat in the area of the device.

In general, a surgical or operating room microscope is draped or covered during an operation to maintain a sterile environment and to allow the physician to concentrate on the area of the patient he is operating on. Such microscopes as used in the prior art contain additional lamp assemblies or housings which include high intensity and high power lamps. The light from the lamp is directed into the optical path of the microscope by means of lenses or prisms to increase illumination. Such devices are coupled to the body of the microscope by means of a suitable housing and become part of the microscope assembly. As such, these housings are also draped during surgery and the associated lamps severely increase the ambient temperature within the surgical draping canopy. Due to the increased heat, the additional lamp source is subjected to a relatively high failure rate and such a failure will necessitate the replacement of the lamp during a surgical procedure at great expense in time and effort. As one can imagine, time is of the essence in an operative procedure and such results could jeopardize the patient.

Hence, the prior art attempted to inject additional light into the optical path of the microscope by using fiber optic cables to conduct light from a remote source. Most of these attempts were unsuccessful as the light so injected served to distort the depth of field of the microscope and hence, unduly affected the surgeon's field of view during an operation.

Furthermore, the use of fiber optics employed prisms to bend or angle the light and resulted in a loss of intensity, which limited the amount of the additional light introduced.

The major desire of such apparatus is to introduce additional light into the optical path of a conventional microscope without affecting the design of the instrument or its operating characteristics. Such microscopes are in widespread use and are relatively expensive and quality devices. Physicians rely on the characteristics of such microscopes and are familiar with their operation and adjustments.

An example of a particular successful instrument is the OPMI 1 microscope manufactured by the Carl Zeiss Company of West Germany. This particular instrument has provisions for increasing the light in the microscope by providing a lamp housing assembly which is coupled to the body of the scope. As above indicated, this housing is associated with and provides large amounts of heat which result in the above noted difficulties.

Also in regard to such operating room microscopes is the requirement that additional light is further desirable because of additional attachments which may be necessary to to monitor the progress of the operation. For example, operating room microscopes have provisions for attaching additional apparatus to the body of the microscope so that the physician may photograph the area by the use of a 35 millimeter camera or a television monitor may be coupled to the microscope to monitor the progress of the operation. Such attachments such as a television or 35 millimeter camera require more light.

It is, of course, understood that the apparatus for increasing the light input to a microscope should also do so by internal means. External lights of course, can be used to illuminate the operating area but they serve to decrease the physical distance from the objective lens of the microscope to the object plane. This becomes a real problem for the surgeon because by doing this, one alters the physical difference between the bottom of the microscope and the area he is viewing and hence, gives the surgeon less space in the operating area. Therefore, a surgeon prefers an internal illumination scheme over an external system because of the additional space required.

It is therefore an object of the present invention to increase the amount of light in a microscope without unduly affecting the operation of the device and without providing additional heat in the immediate area of the microscope.

BRIEF DESCRIPTION OF PREFERRED EMBODIMENT

In a microscope including a microscope body disposed about a central axis defining an optical axis, an objective lens positioned within said body and aligned about said axis, and an eyepiece lens assembly disposed about said axis and adapted for viewing an object positioned at an object plane located beneath said objective lens, the combination therewith of apparatus for increasing the light at said object plane, comprising means coupled to said body and positioned above said objective lens to direct input light rays relatively parallel to said axis towards said object plane, said means including a lens assembly adapted to concentrate said rays of light at a given location, and deflecting means positioned at said location and adapted to deflect said rays parallel to said axis and through said objective lens to said object plane and means coupled to said objective lens for tilting said lens at a slight angle with respect to said axis to prevent spurious light rays as reflected from the surface of said objective lens to appear at said eyepiece lens assembly. In another embodiment, the entire optical system is tilted at a suitable angle and the objective lens is not altered. The tilting of the optical system serves to prevent spurious light rays as reflected from the back surface of the objective lens to appear at the eyepiece lens assembly.

DETAILED DESCRIPTION OF FIGURES

Figure 1:
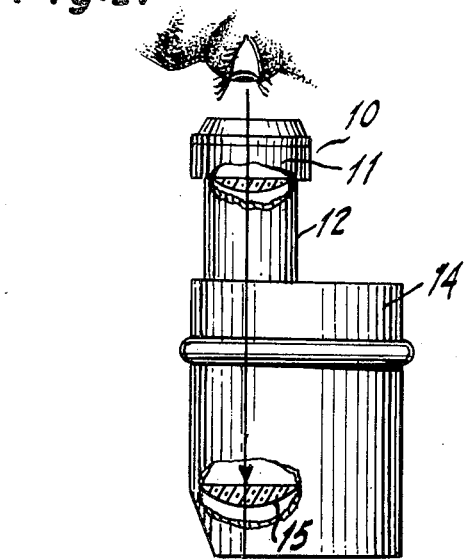
FIG. 1 is a schematic side view of an operating room microscope employing light injecting apparatus according to this invention.

Referring to FIG. 1, there is shown a diagrammatic view of a typical operating room microscope such as the OPMI-1 above mentioned.

Essentially, the microscope is a binocular device having a separate eyepiece as 10 for the right and left eye. For present purposes only, one eyepiece is shown and is completely sufficient for purposes of explaining the invention.

The eyepiece 10 is associated with one or more lens assemblies as is known in the art and the magnified image from the microscope is viewed at the eyepiece as one would view an image from an ordinary magnifying glass. The eyepiece 10 is associated with a binocular tube 12 of a predetermined focal length and selected for either straight or inclined viewing.

The binocular tube 12 interfaces with another tube or cavity 14 which contains another objective lens assembly 15. The function of the objective lens 15 is to focus the parallel light rays reflected from the objective plane.

The cavity 14 also contains the prisms which are used to enable binocular viewing. The cavity 14 is sometimes referred to as the binocular head. The prisms are used to erect the image so that it is viewed in proper prospective at the eyepiece 10. These prisms contained in cavity 14 essentially shorten the optical path as well as inverting the image so that it is seen correctly at the eyepiece 10.

The microscope further includes a variable magnifying section 16 which includes separate lens assemblies as 17 and 18. These lenses can be rotated or switched into the optical path of the microscope to change the magnification of the unit. The magnification changes do not affect the working distance of the microscope and are used during an operation according to the desires of the surgeon.

Shown located beneath the magnification changer 16 is the objective lens assembly 20 of the microscope. Basically, the objective lens 20 may comprise a series of lenses, but for the sake of simplicity is shown as a single lens. The objective lens 20 of a typical microscope has a focal length which is relatively short as from one hundred to eight hundred millimeters, depending upon the type of surgical operation to be performed.

Shown located beneath the objective lens 20 is the object plane 21 or that plane at which the object or area to be viewed via the eyepiece 10 is positioned. The optical axis 30 of the microscope is shown and this axis passes through the central point of the lenses such as the objective lens assembly 20, the magnification lens assembly 18 and the ocular assembly.

The light path of the microscope is also along the optical axis 30 and light rays are relatively coaxial with respect to the optical axis 30. Light which is reflected from the object at plane 21 is directed back through the body of the microscope via the lens assemblies indicated and viewed at the image plane or eyepiece 10.

As can be seen from FIG. 1, the location at which additional light energy can be introduced into such a device is limited and the optimum place for introduction of additional light is directly above the objective lens assembly 20. This location is desirable as additional light introduced into the microscope has to be aligned with the optical axis 30 and essentially, must be relatively parallel to the axis 30 in order to enable proper use of the microscope in regard to illumination of the object.

The microscope has an opening or port 22 located in housing 16, which port 22 couples to a lamp housing assembly for increasing the light directed to the object plane 21. This prior art assembly includes a prism arrangement to bend the light rays from the lamp in the housing to thence direct the rays through the objective 20. The prism assembly is specially tailored at great expense to provide the bending of these rays without distortion.

The port 22 is also employed in the present invention to introduce additional light at the object plane 21 via the objective lens assembly 20. A housing 31 is coupled to the port 22 and basically, is dimensioned to accommodate and cover the opening in housing 16 of the microscope. The housing 31 may be of any suitable configuration and had a front open section 31A.

Depending from the front section 31A is a member 32 located at an angle of about forty-five degrees with respect to the optical axis 30. The member 32 has a surface 33 facing the hollow of housing 16. The mirror 33 is a first surface mirror having an extremely flat and uniform surface. The mirror is approximately rectangular in shape and is about 38×33 millimeters. Positioned in the housing 31 is a lens 34. Lens 34 is a rectangular lens which serves to converge the light rays introduced at the input side of the lens by a fiber optic bundle or cable 35. The lens 34 has the optical axis relatively perpendicular to axis 30.

The fiber optic cable 35 is accommodated within a front aperture 36 in housing 31 and is directed to a remote lamp source 40 having a high power, high wattage halogen lamp 42. The cable 35 may be several feet in length and hence, the source 40 is located at a position removed from the microscope. The fiber optic cable enables illumination via the lens 34. The fiber optic cable 35 is referred to as a "cold" source since it does not propogate the heat generated by lamp 42, but does propagate the light.

Thus, the amount of additional light applied to the microscope is limited solely by the intensity of the source 40, the lens 34 and the mirror 33 characteristics and one can therefore substantially increase the light via the objective lens 20 as directed to the object plane 21. The introduction of light in this manner appears quite simple and undestandable as the lens 34 concentrates the image of the light from cable 35 which is then deflected forty-five degrees by the mirror 33 so that it is directed parallel to the optical axis 30 of the microscope and via the objective lens 20 to the object plane 21 to thus increase the illumination of the object as desired.

The mirror 33 being a non-directional device also operates to reflect light from the rear portion of the objective lens 20, which reflected light produces an undesirable halo at the visual plane 10 of the microscope. Essentially, the mirror is relatively large and provides an image through the objective lens 20 which occupies about one-half of the lens area. The dimensions of the mirror 33 serve to determine the amount of light which can be added to the microscope and the larger the mirror, the more light. However, light is reflected from the back surface of the objective lens 20 and returned to the visual field of the microscope and causes interference at the visual plane. In order to circumvent this problem and to allow large amounts of light to be added to the microscope, the objective lens 20 is tilted at a relatively small angle with respect to the optical axis. It has been determined that tilting of the objective lens 20 at an angle of about five degrees serves to prevent the above described reflected light from producing interference at the visual plane.

The slight tilting of the objective lens 20 does not distort the field of view of the microscope as the angle is well within required tolerances. It is improtant that the lens 20 be tilted with respect to the axis 30 at this angle or the housing 31 be tilted accordingly to prevent interference at the visual plane 10.

Figure 2:
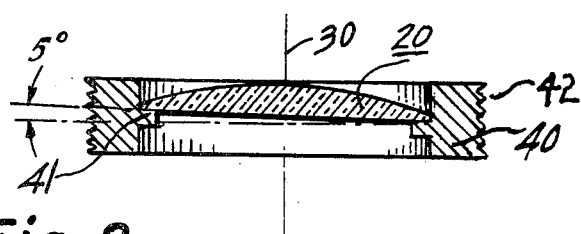
FIG. 2 is a cross-sectional view of an objective lens holder assembly according to this invention.

Referring to FIG. 2, there is shown a cross-sectional view of a lens holder 40 for supporting an objective lens 20 at an angle of about five degrees with respect to the optical axis 30. Essentially, the lens 20 is supported with the holder 40 by means of an internal angle flange 41 and the lens 20 is then cemented or otherwise secured. The holder 40, by means of the peripheral thread 42 is screwed into position in the objective lens plane of housing 16 as is conventional. When inserted into the microscope, the tilted objective lens 20 is rotated until the "halo" disappears from view at the eyepiece 10 and the microscope is now ready to be used with the additional light source.

Figure 3:
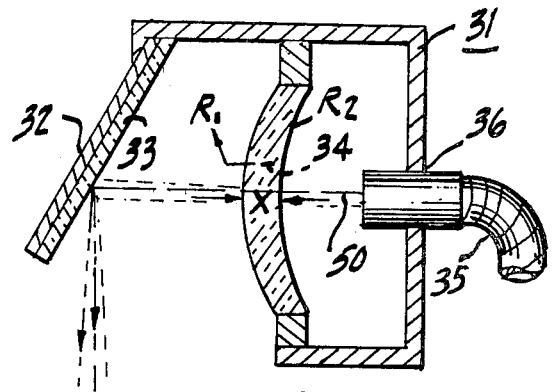
FIG. 3 is a cross-sectional side view of the light injector apparatus according to the invention.

Referring to FIG. 3, there is shown a cross-section view of housing 31. The lens 34 is a rectangular lens and is located about twenty-two millimeters from aperture 36, which coacts and holds the fiber optic cable.

Positioned about twenty-two millimeters from the front of the lens 34 is the center of the mirror 33. The center of the mirror is about thirteen millimeters from the objective lens 20 when the housing 31 is positioned in port 22. The mirror 33 is a first surface as above indicated and is also rectangular being about 38×33 millimeters and held at an angle of forty-five degrees with respect to the optical axis 30. The lens 34 has a radius $R_1$ of 21 diopters or 47.61 millimeters, with a radius $R_2$ of −6.00 diopters or −150 millimeters. The thickness X at the center axis 50 is about 7.6 millimeters.

Figure 4:
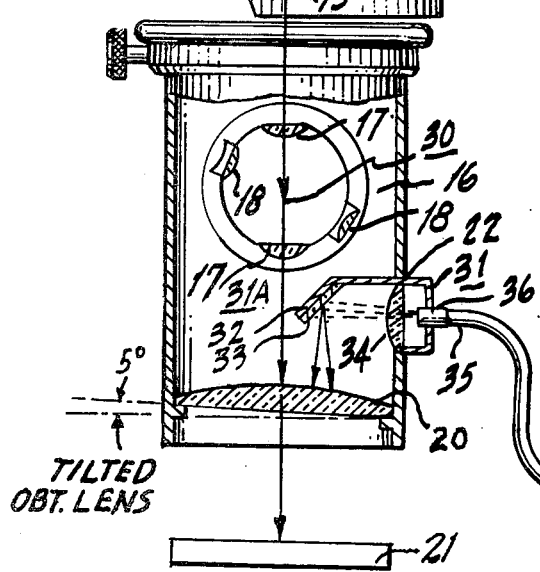
FIG. 4 is a front view of a lens assembly employed in the light injecting apparatus.
Figure 4:
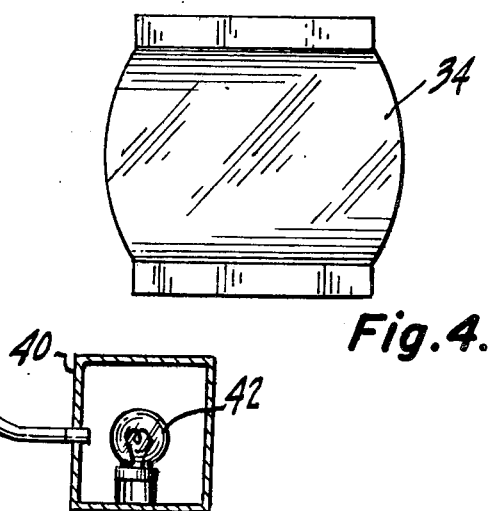

FIG. 4 shows a front view of the lens 34. The lens 34 is cemented or otherwise secured in the housing 31 in such a manner that all the light emanating from the fiber optic cable is directed through the lens 34 and is thence reflected by the mirror 33.

Since both the lens 34 and mirror 33 are extremely efficient, one obtains an efficient coupling of light and a substantial increase in light at the visual plane and the systems can provide illumination in such microscopes above eleven thousand foot-candles.

Figure 5:
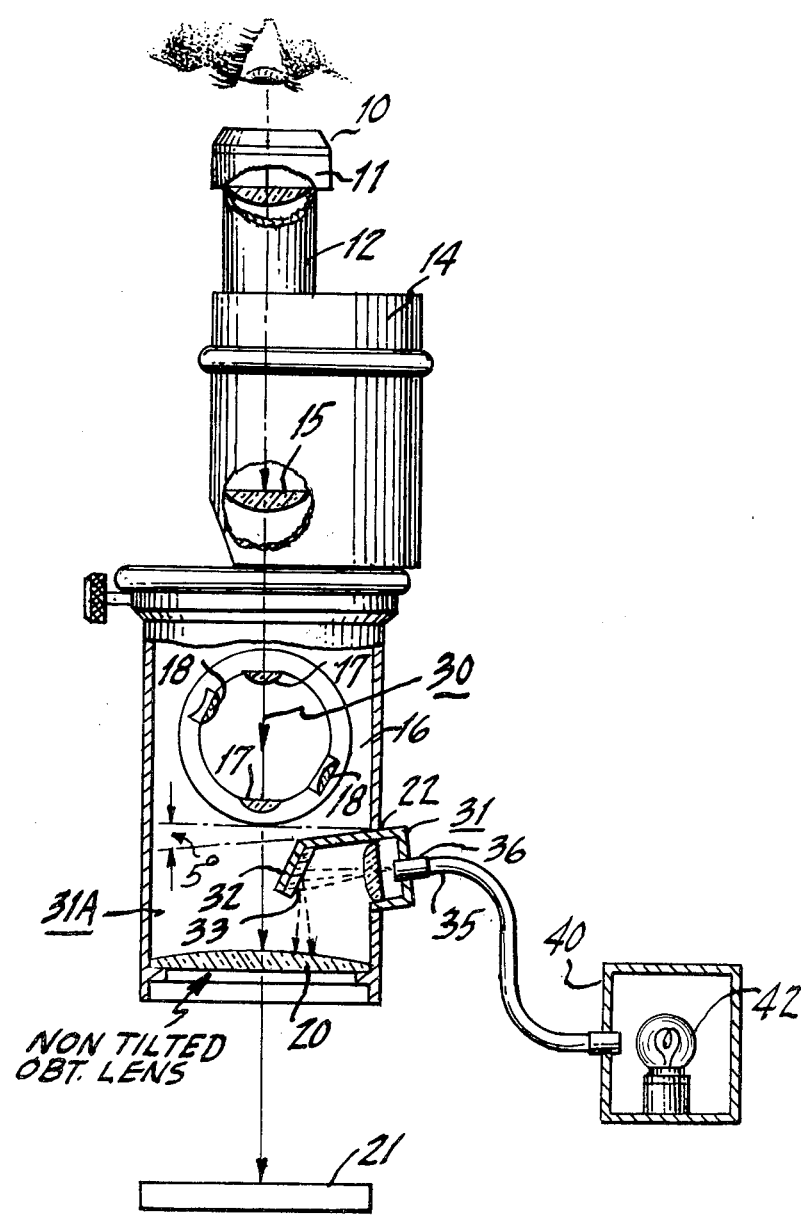
FIG. 5 is a schematic side view of an operating room microscope employing an alternate embodiment of light injecting apparatus according to this invention.

Referring to FIG. 5, there is shown a microscope relatively identical to the one depicted in FIG. 1.

In any event, the entire optical system including housing 31 is tilted at an angle of five degrees with respect to the optical axis 30. In this embodiment, the objective lens assembly is not tilted and essentially, the exact microscope as obtained from the manufacturer is employed without tilting the objective lens.

By tilting the housing 31 or the whole optical system which consists of the fiber optic bundle 35, the lens 34 and the mirror 32, one obtains the same compensation as above described. In any event, by tilting the optical illumination system it is important to maintain the center of the mirror 33 as close to the optical axis 30 as possible. In this manner, the closer the center of the mirror is to the optical axis, the more coaxial the illumination will be with respect to the optical axis. By tilting the whole illumination system at an angle of five degrees, it causes the reflected light from the rear surface of the objective lens to be reflected so that it does not return to the visual plane of the microscope.

The technique of tilting the entire optical system contained for example, in housing 31, is preferable to tilting the objective lens. As indicated above, the slight tilting of the objective lens does not interfere with the operating characteristics of the microscope.

In any event, a slight tilting of the object lens can affect aberration. For example, since these devices are binocular devices, a tilting of the objective lens may provide a difference in the field or depth between one eye and the other eye and slightly affect the viewing characteristics of the devices. By tilting the entire optical system, one eliminates this problem as well as the further problem that one does not have to rotate the tilted lens in order to obtain proper compensation. Hence, the tilting of the entire optical system is a preferred way of accomplishing the result.

When tilting the housing above described, dimensions are varied. Hence, the position from the front of the lens 34 to the center of the mirror 33 is about ten millimeters. The center of the mirror 33 is about twenty-five millimeters from the objective lens 20 when the housing 31 is positioned in port 22 at a five degree angle. The size of the mirror and the lens remain the same.

I claim:

1. In a microscope including a microscope body disposed about a central axis defining an optical axis, an objective lens positioned within said body and aligned about said axis, and an eyepiece lens assembly disposed about said axis and adapted for viewing an object positioned at an object plane located beneath said objective lens, the combination therewith of apparatus for increasing the light at said object plane, comprising:
   (a) a housing having an internal hollow with a first opened end, a lens assembly mounted within said hollow and adapted to converge rays of light, deflecting means coupled to said housing at said opened end and positioned at an angle of about forty-five degrees with respect to the main axis of said housing, means coupled to said housing for introducing light rays, which rays are converged by said lens and deflected downward by said deflecting means,
   (b) means coupling said housing to said microscope body for positioning said housing at a small angle of about 5 degrees from a line perpendicular to said optical axis, to cause said downward deflected rays to be directed through said objective lens and because of said small angle, to prevent spurious light rays from appearing at said eyepiece lens assembly with distortion at said eyepiece lens assembly.

2. The apparatus according to claim 1 wherein said means coupled to said housing for introducing light rays includes a fiber optic cable having one end proximate to said lens assembly and an other end adapted to receive input light rays.

3. The apparatus according to claim 1 including a light source located at a remote position from said microscope and positioned to illuminate said fiber optic cable at said other end.

4. The apparatus according to claim 1 wherein said small angle is about five degrees, whereby said housing has its main axis at about an angle of 40 degrees with respect to said optical axis.

5. The apparatus according to claim 1 wherein said deflecting means is a first surface mirror.

* * * * *